(12) United States Patent
Vickers

(10) Patent No.: US 6,619,337 B1
(45) Date of Patent: Sep. 16, 2003

(54) RIGID INSERT FOR ENGINE WELDER COWING

(75) Inventor: Robert V. Vickers, Chagrin Falls, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 10/177,347

(22) Filed: Jun. 24, 2002

(51) Int. Cl.[7] ................................................ B65B 1/30
(52) U.S. Cl. ........................ 141/98; 220/86.1; 219/133; 296/97.22
(58) Field of Search ..................... 141/86, 98, 371 A, 141/312; 220/86.1, 86.2; 219/133; 280/834; 322/1; 123/3; 296/97.22

(56) References Cited

U.S. PATENT DOCUMENTS

| | | | | |
|---|---|---|---|---|
| 2,508,124 A | * | 5/1950 | Stephenson | ................. 220/86.2 |
| 4,252,245 A | * | 2/1981 | Kudo | ......................... 220/86.2 |
| 6,033,006 A | * | 3/2000 | Bovellan et al. | ......... 296/97.22 |
| 6,172,332 B1 | | 1/2001 | Trinkner | |
| 6,263,926 B1 | | 7/2001 | Bender | |

* cited by examiner

*Primary Examiner*—J. Casimer Jacyna
(74) *Attorney, Agent, or Firm*—Fay, Sharpe, Fagan, Minnich & McKee

(57) ABSTRACT

A rigid inverted insert for mounting on the top panel of a rigid cowing of an engine welder, which cowing has a cut away opening in a top panel for allowing access to the top opening of a fuel filler tube extending from a low fuel tank to a position adjacent the rigid cowing. The novel insert has a lower wall generally to the top panel, but substantially below the top panel wherein the lower rigid wall has a central opening surrounding the filler tube to define a peripheral gap around the tube and a soft grommet or seal is mounted in the central opening and fixed to the insert.

50 Claims, 3 Drawing Sheets

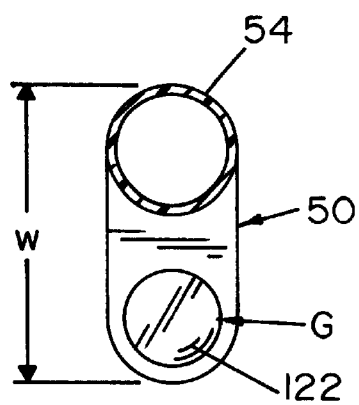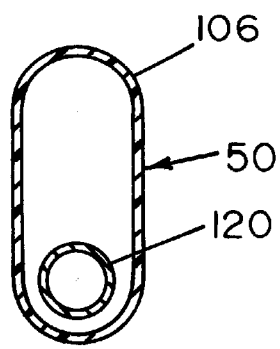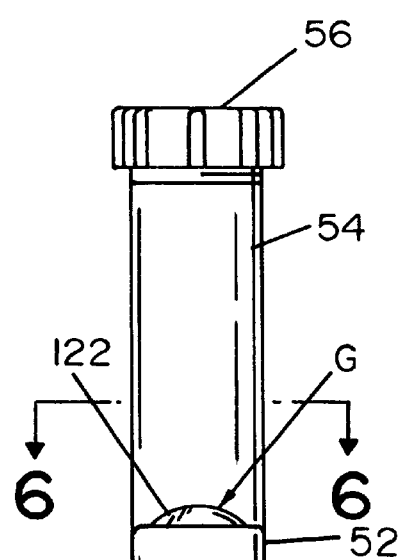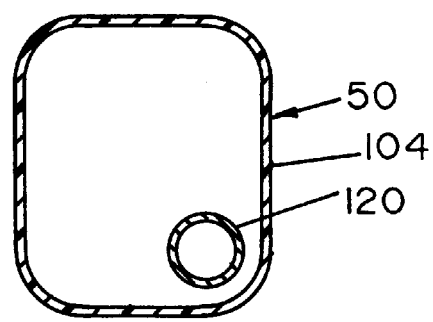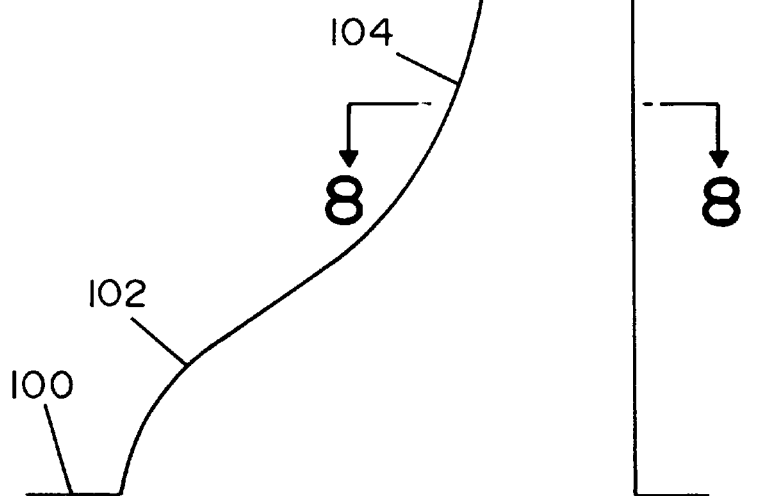

RIGID INSERT FOR ENGINE WELDER COWING

The present invention relates to an engine welder and more particularly to a novel rigid insert to support the cowing of a fuel tube of an engine welder.

INCORPORATION BY REFERENCE

The present invention relates to an engine welder having a cut away portion in the upper housing to accommodate a standard filler tube extending from a lower fuel tank. When this fuel tank arrangement was first introduced in the Ranger 8 by The Lincoln Electric Company, the cut away was in the top panel of the cowing with a plastic escutcheon mounted around the filler tube to enclose the cut away and support the tube. When it was desired to incorporate a vertically extending mechanical gage with the filler tube, it was no longer practical to bring both the filler tube and gage to the top panel of the cowing. Thus, an escutcheon design was developed to accommodate both the upper neck of the filler tube and the top dial or indicator of the gage. This escutcheon was constructed of a single piece of plastic as used in the Ranger 9. This plastic unit was inserted in the cut away portion of the cowing in a manner to accommodate the lower level necessary for the mechanical gage. This filler tube and gage combination is disclosed in Bender U.S. Pat. No. 6,263,926, which is incorporated by reference herein as background information. As the mechanical gage required access to a position substantially below the top panel of the cowing, the standard filler tube designed was modified for side access. In that construction, a one piece plastic element was mounted between the cut away and the upstanding filler tube. In Trinkner U.S. Pat. No. 6,172,332 which is also incorporated by reference herein as background information, the filler tube does not have a mechanical gage, but only allows side access to the filler neck. The two plastic moldings for accommodating either a lower mechanical gage with the neck or side access to the neck, each involved a single molded plastic unit mounted over the cut away, the molded plastic has an opening for sealing around either the gage and filler tube neck combination or the filler tube neck itself. These two one piece plastic units are widely used commercially and are disclosed in the two patents incorporated by reference herein.

BACKGROUND OF INVENTION

When using a one piece plastic insert between the cowing cut away portion or opening and the upstanding elements, be they a combination of filler tube neck and gage or merely a filler tube neck, two technical disadvantages existed. First, the material of the insert was flexible and did not rigidify the cowing at the side cut away opening or stabilize the filler tube. Consequently, there was a physical weakness of the cowing in this area which could cause deflection of the cowing and deflection of the insert around the upstanding members. The upstanding tube could be deflected laterally. More importantly, the plastic used for the insert was a compromise between the need for physical rigidity and the requirement of a flexible seal around the upstanding tube. Consequently, there was not a good seal around the tube, which allowed gasoline to migrate downwardly around the tube into the area under the cowing. These disadvantages were dictated by the construction of the structures disclosed in Bender U.S. Pat. No. 6,263,926 and Trinkner U.S. Pat. No. 6,172,332.

THE INVENTION

In accordance with the present invention, there is provided a rigid insert for mounting in the cut away portion at the top corner of a cowing in a standard engine driven welder. This insert is made from a rigid material, such as stamped sheet metal or high hardness plastic. It has an essentially inverted cup shape configuration opened from the top and side. This hard inverted cowing insert has a lower generally flat, rigid wall with an opening surrounding the upstanding tube be it a filler neck or filler neck in combination with the upper portion of a mechanical fuel gage. The apertured lower wall of the rigid cowing insert is provided with a soft plastic or elastomeric grommet which merely fills the small gap between the opening in the rigid lower wall and the upstanding elements extending through the opening. By using the present invention, the insert is a physical depression in the rigid cowing of the engine welder. This depression could be provided by a metal drawing action; however, such drawing action would be too expensive and would cause a substantially thin cross-section for the depressed portion of the cowing. By using the present invention, the inverted insert rigidifies the cowing provided with an access cut away and stabilizes the filler tube. The gasket in the opening of the lower wall is quite flexible and allows easier insertion of the upstanding tube extending from the lower fuel tank. Thus, the insert rigidifies the cowing and the gasket is designed to provide the necessary sealing action of the upstanding tube coming from the fuel tank.

The primary object of the present invention is the provision of an engine welder with a lower fuel tank and a cut away opening in the upper panel of the cowing, which engine welder has a rigid insert fixed to the cowing to provide a lower wall with an opening matching the upstanding filler to be of the lower fuel tank.

Another object of the present invention is the provision of an engine welder, as defined above, which engine welder includes a soft sealing gasket in the opening of the rigid wall and around the upstanding element protruding through the lower wall.

Still a further object of the present invention is the provision of an engine welder, as defined above, which engine welder includes a rigid cowing insert and a soft rubber or plastic seal in the opening of the lower wall in the insert.

Yet another object of the present invention is the provision of an engine welder, as defined above, which engine welder has a rigid insert that can accommodate a filler tube having either a combined filler neck and upwardly extending mechanical gage or merely an upper filler neck. Both of these elements are the "filler tube" of the engine welder so a soft flexible gasket or grommet provides a seal between the lower wall of the insert and the upstanding filler tube.

These and other objects and advantages will become apparent from the following description taken together with the accompanying drawings.

BRIEF DESCRIPTION OF DRAWINGS

FIG. 5 is a schematic side view of the filler tube including a lower mechanical gage and extended neck taken generally along line 5—5 of FIG. 4, but extending downwardly to the lower fuel tank;

FIG. 6 is a cross-sectional area taken generally along line 6—6 of FIG. 5;

FIG. 7 is a cross-sectional view taken generally along line 7—7 of FIG. 5; and,

FIG. 8 is a cross-sectional view taken generally along line 8—8 of FIG. 5.

PREFERRED EMBODIMENT

Figure 1:
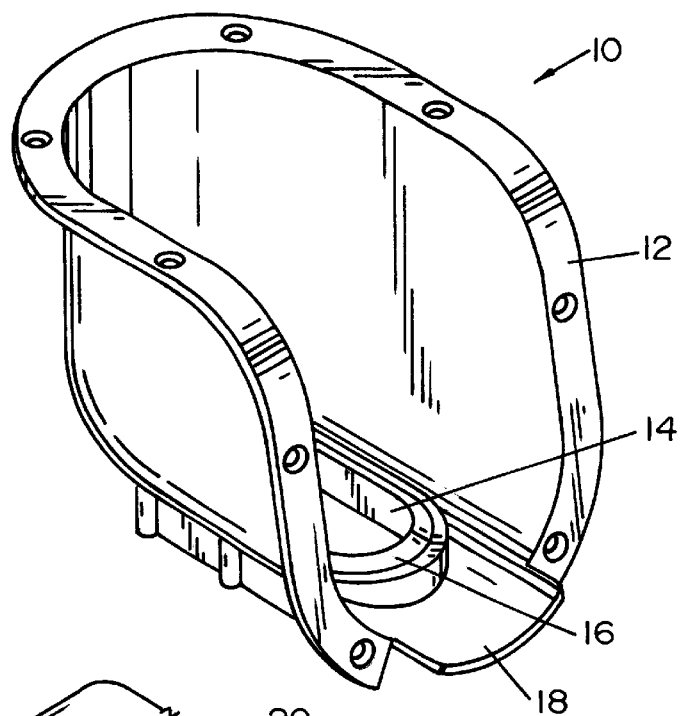
FIG. 1 is a pictorial view of a prior art one piece unit.

Referring now to the drawings wherein the showings are for the purpose of illustrating the preferred embodiment only and not for the purpose of limiting same, FIG. 1 shows a prior art escutcheon 10 with a one piece plastic body including an outwardly extending flange 12 and a lower opening 14 around which is a rigid sealing strip 16. Overflow lip 18 directs spilled fuel outwardly from the escutcheon over the side of the engine welder, as shown in Bender U.S. Pat. No. 6,263,926 and Trinkner U.S. Pat. No. 6,172,332. Escutcheon 10 is formed from a plastic material that closes a cut away corner portion 20 of the cowing over the top of the engine welder. Consequently, the plastic must be a compromise between the necessary support for the cowing and the upstanding filler tube as well as the flexibility needed for forming a fuel tight seal around the upstanding filler tube. In this compromise, the seal around the filler tube is not tight and it is difficult to push the filler tube through opening 14 due to the rigidity of sealing strip 16. These disadvantages are overcome by the present invention.

Figure 2:
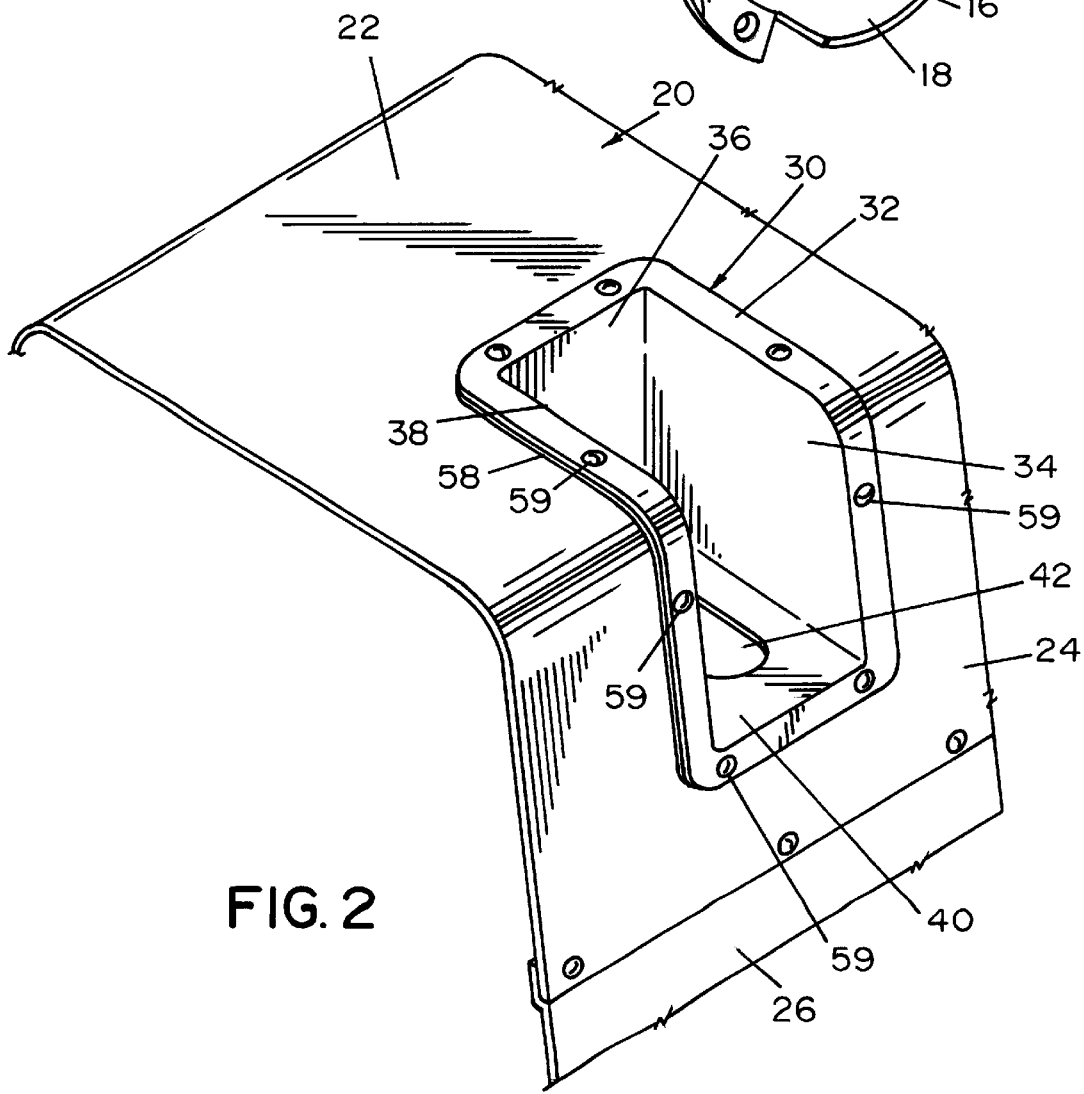
FIG. 2 is a pictorial view of the preferred embodiment of the present invention mounted over the cut away opening of the cowing.
Figure 3:
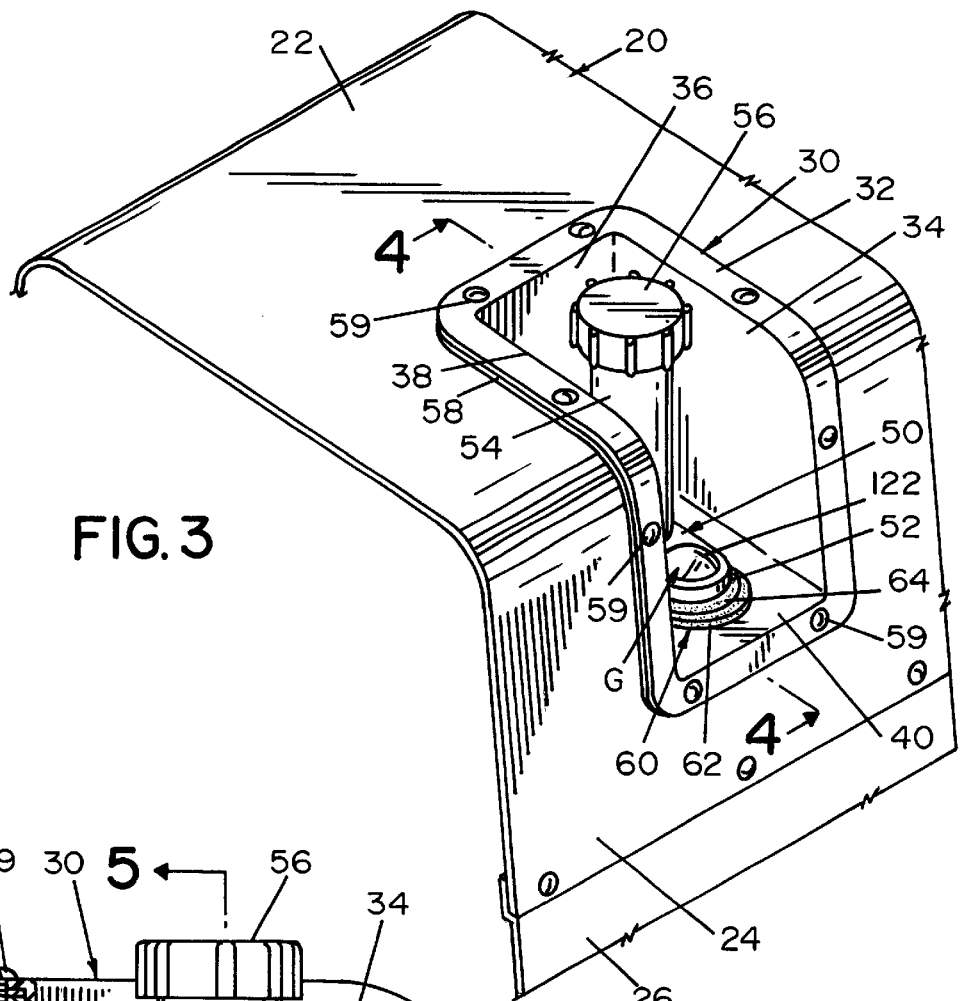
FIG. 3 is a view similar to FIG. 2 illustrating the filler tube of the type including a combined filler neck and lower mechanical fuel gage.
Figure 4:
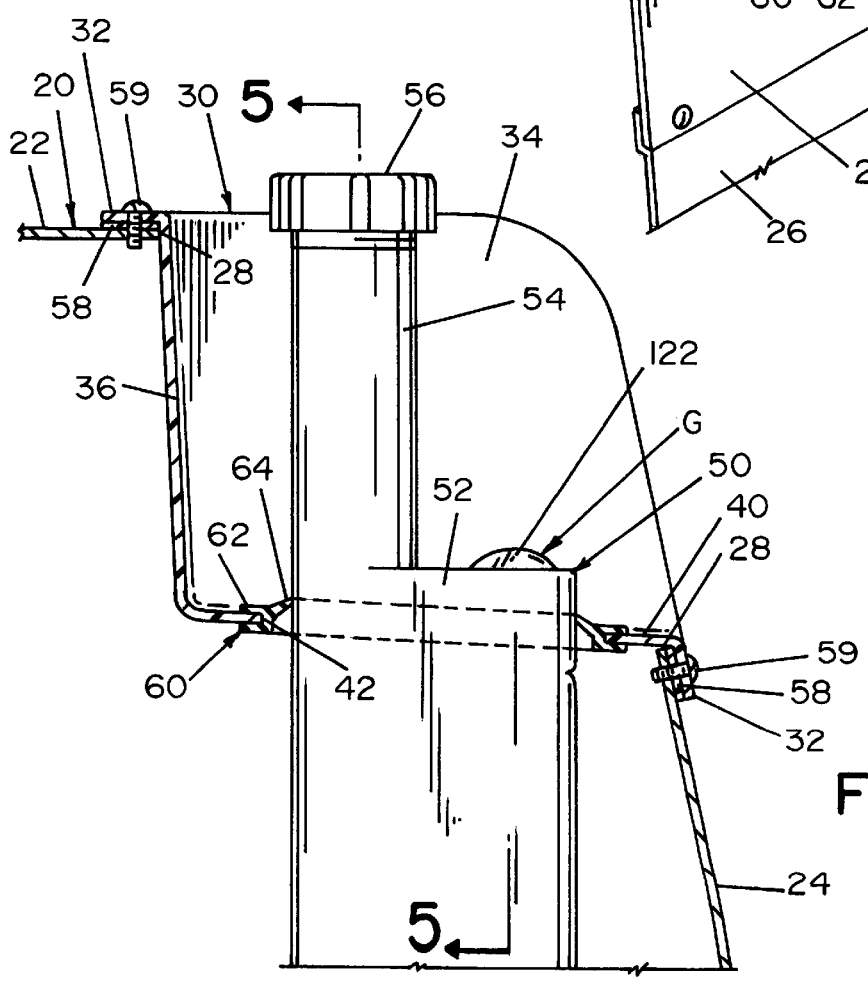
FIG. 4 is an enlarged cross-sectional view taken generally along line 4—4 of FIG. 3.

Referring now to FIGS. 2–4, cowing 20 over the top of an engine welder includes a top panel 22 and two side panels, one of which is shown as downwardly extending panel 24 fixedly mounted to side plate 26 extending from a lower base of the engine welder. A second side panel and side plate is on the opposite side of cowing 20. In accordance with standard practice, corner cut away 28 provides access to an upstanding filler tube from a lower fuel tank. Cut away 28 is closed by a rigid, inverted insert 30 having a peripheral flange 32 and vertically extending side walls 34, 36 and 38. Rigid, generally flat bottom wall 40 of insert 30 is generally parallel to top panel 22, but is below the top panel by an amount preferably in excess of 3.0 inches. Central opening 42 has a shape to match and surround the cross sectional profile of upstanding filler tube 50, shown in the preferred embodiment as a combined mechanical gage portion 52 and a filler neck 54 with an upper cap 56. In an embodiment of the invention where there is only an upper neck 54 in the filler tube, opening 42 is circular. A peripherally extending gasket 58 below flange 32 seals insert 30 around the opening of cut away 28 by use of a plurality of spaced bolts 59. As so far described, rigid insert 30 is bolted into and forms the downward depression of cowing 20. This depression is to define a lower, rigid support wall 40, with a clearance opening 42. For practical reasons, the length of gage G in tube 50 does not extend to the top of cowing 20. Thus, the top of the gage G is below cowing 20. This necessitates the formation of the lower wall 40 with opening 42, that is small and a fixed configuration. In accordance with the invention, the material of insert 30 is preferably a rigid plastic with a hardness exceeding about 120 Rockwell A. As an alternative, the insert is formed from sheet metal matching the sheet metal of cowing 20. In either embodiment, insert 30 rigidifies the cut away 28 in cowing 20 so that cowing is not flexible and rigidly supports or stabilizes the upstanding filler tube 50. The rigidity of the insert gives stability to the upper portion of the filler tube and is an advantage over the prior art shown in Bender U.S. Pat. No. 6,263,926. By using rigid insert 30 with a small profiled opening 42, a standard grommet or seal 60 formed from a soft elastomeric material can be used in the opening. The seal has a peripheral portion 62 engaging insert 30. Grommet or seal 60 includes flexible lip 64 which is soft and allows easy insertion of the filler tube while including a resilient memory to form a tight seal. This prevents fuel from migrating downwardly under the cowing around seal 60. The grommet or seal is soft and preferably is an elastomeric substance with a Durometer A of less than 50. In this manner, grommet or seal 60 is formed from a material for insertion and sealing of upstanding filler tube 50. The insert itself is rigid to define a downwardly protruding rigid extension of cowing 20. Consequently, wall 40 is parallel to top panel 22, but it still as rigid as the top panel. In the past, the opening was in a flexible molding and allowed no support for tube 50.

Referring now to FIGS. 5–8, lower fuel tank 100 supported on the lower base of the engine welder is the tank filled by fuel through filler tube 50. In accordance with the preferred embodiment, the width of tube 50 in the transverse direction is generally fixed as indicated by dimension w in FIG. 6. To allow fuel being filled to move slowly up tube 50, the lower portion of the tube has an enlarged area 102 that is gradually reduced to area 104, as shown in FIG. 8. The tube is then generally fixed in cross-section from area 106 to gage G. Above the gage neck 54 is generally circular in cross-section as shown in FIG. 6. Mechanical gage G is a standard off the shelf item with a rod schematically illustrated as tube 120 extending from the upper indicator 122 to the lower portion of tank 100. Since this off the shelf gage has a fixed length less than the distance from the bottom of the fuel tank to cowing 20, gage G terminates substantially below the top of neck 54. In FIG. 5 gage G is illustrated as being in front of neck 54. Consequently, filler tube 50 using the embodiment shown in FIG. 5 would be rotated 90° from the preferred embodiment illustrated in FIGS. 2–4. In this manner, upper indicator 122 would be on the side when fuel was pumped into neck 54. The orientation of gage G is a factor in the embodiment of the invention shown; however, when only a circular filler neck is used, the orientation is not a factor.

Having thus defined the invention, the following is claimed:

1. An engine driven welder comprising a lower base for supporting an internal combustion engine and a generator driven by said engine, a rigid cowing with a top panel and first and second side panels extending downwardly toward said base, and a fuel tank adjacent said lower base with a filler tube extending from said tank to a position adjacent said top panel of said cowing, said filler tube a top opening and an upper portion with an outer profile, said cowing having a cut away opening allowing access to said top opening of said filler tube, a rigid inverted insert fixed on said cowing and extending into and closing said cut away portion, said inverted insert having a lower wall generally parallel to said top panel, but substantially below said top panel, said wall having a central opening surrounding said outer profile to define a peripheral gap around said upper portion of said filler tube, and a soft grommet mounted in said central opening and fixed to said insert, said grommet having an inwardly facing flexible lip engaging said upper portion of said filler tube to fill said peripheral gap.

2. An engine welder as defined in claim 1 wherein said insert is formed from a first rigid plastic and said grommet is formed from a second soft plastic.

3. An engine welder as defined in claim 2 wherein said cowing is formed from metal.

4. An engine welder as defined in claim 3 wherein said insert includes an outwardly extending drain lip.

5. An engine welder as defined in claim 3 wherein said lower wall is spaced from said top panel by at least 3.0 inches.

6. An engine welder as defined in claim 3 where said rigid insert is formed from a material with a hardness of over about 120 Rockwell R and said soft grommet has a hardness of less than 50 Durometer A.

7. An engine welder as defined in claim 2 wherein said filler tube includes a mechanical gage and said upper portion profile is defined by said gage and a filler extension of said tube.

8. An engine welder as defined in claim 2 wherein said insert includes an outwardly extending drain lip.

9. An engine welder as defined in claim 2 wherein said cut away opening intersects both said top panel and one of said side panels.

10. An engine welder as defined in claim 9 wherein said lower wall is spaced from said top panel by at least 3.0 inches.

11. An engine welder as defined in claim 2 wherein said lower wall is spaced from said top panel by at least 3.0 inches.

12. An engine welder as defined in claim 2 where said rigid insert is formed from a material with a hardness of over about 120 Rockwell R and said soft grommet has a hardness of less than 50 Durometer A.

13. An engine welder as defined in claim 1 wherein said cowing is formed from metal.

14. An engine welder as defined in claim 13 wherein said insert is formed from metal.

15. An engine welder as defined in claim 13 wherein said cut away opening intersects both said top panel and one of said side panels.

16. An engine welder as defined in claim 15 wherein said lower wall is spaced from said top panel by at least 3.0 inches.

17. An engine welder as defined in claim 1 wherein said insert is formed from metal.

18. An engine welder as defined in claim 17 wherein said filler tube includes a mechanical gage and said upper portion profile is defined by said gage and a filler extension of said tube.

19. An engine welder as defined in claim 17 wherein said insert includes an outwardly extending drain lip.

20. An engine welder as defined in claim 17 wherein said cut away opening intersects both said top panel and one of said side panels.

21. An engine welder as defined in claim 20 wherein said lower wall is spaced from said top panel by at least 3.0 inches.

22. An engine welder as defined in claim 17 wherein said lower wall is spaced from said top panel by at least 3.0 inches.

23. An engine welder as defined in claim 17 where said rigid insert is formed from a material with a hardness of over about 120 Rockwell R and said soft grommet has a hardness of less than 50 Durometer A.

24. An engine welder as defined in claim 1 wherein said filler tube includes a mechanical gage and said upper portion profile is defined by said gage and a filler extension of said tube.

25. An engine welder as defined in claim 24 wherein said insert includes an outwardly extending drain lip.

26. An engine welder as defined in claim 24 wherein said cut away opening intersects both said top panel and one of said side panels.

27. An engine welder as defined in claim 26 wherein said lower wall is spaced from said top panel by at least 3.0 inches.

28. An engine welder as defined in claim 24 wherein said lower wall is spaced from said top panel by at least 3.0 inches.

29. An engine welder as defined in claim 24 where said rigid insert is formed from a material with a hardness of over about 120 Rockwell R and said soft grommet has a hardness of less than 50 Durometer A.

30. An engine welder as defined in claim 1 wherein said insert includes an outwardly extending drain lip.

31. An engine welder as defined in claim 30 wherein said cut away opening intersects both said top panel and one of said side panels.

32. An engine welder as defined in claim 30 where said rigid insert is formed from a material with a hardness of over about 120 Rockwell R and said soft grommet has a hardness of less than 50 Durometer A.

33. An engine welder as defined in claim 1 wherein said cut away opening intersects both said top panel and one of said side panels.

34. An engine welder as defined in claim 33 wherein said lower wall is spaced from said top panel by at least 3.0 inches.

35. An engine welder as defined in claim 33 where said rigid insert is formed from a material with a hardness of over about 120 Rockwell R and said soft grommet has a hardness of less than 50 Durometer A.

36. An engine welder as defined in claim 1 wherein said lower wall is spaced from said top panel by at least 3.0 inches.

37. An engine welder as defined in claim 36 where said rigid insert is formed from a material with a hardness of over about 120 Rockwell Rand said soft grommet has a hardness of less than 50 Durometer A.

38. An engine welder as defined in claim 1 where said rigid insert is formed from a material with a hardness of over about 120 Rockwell R and said soft grommet has a hardness of less than 50 Durometer A.

39. A rigid inverted insert for mounting on the top panel of a rigid cowing of an engine welder, which cowing has a cut away opening in a top panel for allowing access to the top opening of a fuel filler tube extending from a low,fuel tank to a position adjacent said rigid cowing, said insert having a lower wall generally parallel to said top panel, but substantially below said top panel, said wall having a central opening surrounding said filler tube to define a peripheral gap around said tube, and a soft grommet mounted in said central opening and fixed to said insert, said grommet having an inwardly facing flexible lip for engaging said filler tube to fill said peripheral gap.

40. A rigid insert as defined in claim 39 wherein said insert is formed from a first rigid plastic and said grommet is formed from a second soft plastic.

41. A rigid insert as defined in claim 40 wherein said filler tube includes a mechanical gage extending through said central opening of said lower wall and included in the definition of said peripheral gap around said filler tube.

42. A rigid insert as defined in claim 39 wherein said insert is formed from metal.

43. A rigid insert as defined in claim 42 wherein said flexible lip is formed from a soft elastomeric material.

44. A rigid insert as defined in claim 42 wherein said filler tube includes a mechanical gage extending through said central opening of said lower wall and included in the definition of said peripheral gap around said filler tube.

45. An engine welder as defined in claim 39 wherein said lower wall is spaced from said top panel by at least 3.0 inches.

46. A rigid insert as defined in claim 45 wherein said insert is formed from a rigid plastic.

47. A rigid insert as defined in claim 45 wherein said filler tube includes a mechanical gage extending through said central opening of said lower wall and included in the definition of said peripheral gap around said filler tube.

48. A rigid insert as defined in claim 39 wherein said insert is formed from a rigid plastic.

49. A rigid insert as defined in claim 48 wherein said filler tube includes a mechanical gage extending through said central opening of said lower wall and included in the definition of said peripheral gap around said filler tube.

50. A rigid insert as defined in claim 39 wherein said filler tube includes a mechanical gage extending through said central opening of said lower wall and included in the definition of said peripheral gap around said filler tube.

* * * * *